United States Patent
Oldsen et al.

(10) Patent No.: US 8,539,738 B2
(45) Date of Patent: Sep. 24, 2013

(54) SYSTEM AND METHOD FOR PRODUCING RESIN CARTRIDGES

(75) Inventors: John G. Oldsen, Butler, PA (US); Walter J. Simmons, Martinsburg, WV (US); W. Neal Simmons, Durham, NC (US); Robert A. McGinnis, Jr., Butler, PA (US)

(73) Assignee: J-Lok Co., Pittsburgh, PA (US)

( * ) Notice: Subject to any disclaimer, the term of this patent is extended or adjusted under 35 U.S.C. 154(b) by 0 days.

(21) Appl. No.: 12/621,955

(22) Filed: Nov. 19, 2009

(65) Prior Publication Data

US 2010/0064638 A1  Mar. 18, 2010

Related U.S. Application Data

(62) Division of application No. 11/807,655, filed on May 30, 2007, now Pat. No. 7,637,086.

(60) Provisional application No. 60/861,510, filed on Nov. 29, 2006.

(51) Int. Cl.
B65B 57/14  (2006.01)

(52) U.S. Cl.
USPC ........ 53/52; 53/467; 53/502; 53/503; 53/154; 53/168; 53/539

(58) Field of Classification Search
USPC ............. 53/467, 445, 52, 450, 451, 502, 503, 53/154, 155, 550, 551, 168, 539
See application file for complete search history.

(56) References Cited

U.S. PATENT DOCUMENTS

| | | | |
|---|---|---|---|
| 3,391,047 A * | 7/1968 | Kopp | 156/553 |
| 3,705,646 A * | 12/1972 | Jankowski et al. | 206/219 |
| 3,731,791 A * | 5/1973 | Fourcade et al. | 206/219 |
| 3,737,027 A | 6/1973 | Ball | |
| 3,889,446 A * | 6/1975 | Simmons et al. | 53/451 |
| 3,915,297 A | 10/1975 | Rausch | |
| 3,996,722 A * | 12/1976 | Bernhardt | 53/469 |
| 4,007,831 A * | 2/1977 | Bernhardt | 206/219 |
| 4,126,005 A | 11/1978 | Coursen | |
| 4,408,890 A * | 10/1983 | Beckmann | 366/155.2 |
| 4,433,917 A * | 2/1984 | Mendel et al. | 366/132 |
| 4,497,403 A * | 2/1985 | Rausch | 206/219 |
| 4,603,540 A * | 8/1986 | Kopp | 53/546 |
| 4,616,050 A | 10/1986 | Simmons et al. | |
| 4,621,927 A * | 11/1986 | Hiroi | 366/132 |
| 5,110,521 A | 5/1992 | Moller | |
| 5,775,386 A | 7/1998 | Connan | |

(Continued)

Primary Examiner — Christopher Harmon
(74) Attorney, Agent, or Firm — The Webb Law Firm

(57) ABSTRACT

A method is disclosed for packaging a curable resin composition and a catalyst composition that react with each other when mixed, comprising providing a partitioned tube for receiving the resin composition and the curing agent in separate compartments; delivering a stream of a resin composition into one compartment of the tube; delivering a stream of a curing agent in the other compartment of the tube; advancing the partitioned tube and constricting and sealing the partitioned tube at spaced apart intervals and severing the sealed tube to produce a package partitioning the resin composition from the catalyst composition. Solid particulate is continuously added into the stream of at least one of the catalyst composition and the resin composition and mixing the solid particulate and stream to produce a mixed composition; and the relative amount of solid particulate in the mixed composition is controlled by continuously determining the mass of solid particulate added to the mass of the stream.

12 Claims, 5 Drawing Sheets

(56) References Cited

U.S. PATENT DOCUMENTS

| | | | |
|---|---|---|---|
| 5,935,332 A * | 8/1999 | Caucal | 118/429 |
| 5,993,116 A | 11/1999 | Paxton et al. | |
| 6,541,545 B1 | 4/2003 | Simmons et al. | |
| 6,545,068 B1 | 4/2003 | Simmons et al. | |
| 6,664,316 B1 | 12/2003 | Hywel-Evans | |
| 7,377,685 B2 * | 5/2008 | Breithaupt | 366/152.2 |
| 7,614,781 B2 * | 11/2009 | Esveld et al. | 366/275 |
| 2006/0063266 A1 | 3/2006 | Walworth | |
| 2008/0096118 A1 * | 4/2008 | Mera et al. | 430/109.4 |

* cited by examiner

SYSTEM AND METHOD FOR PRODUCING RESIN CARTRIDGES

CROSS REFERENCE TO RELATED APPLICATIONS

This application is a divisional of U.S. patent application Ser. No. 11/807,655, filed May 30, 2007, which claims the benefit of U.S. Provisional Patent Application No. 60/861, 510, filed Nov. 29, 2006, and both entitled "System and Method for Producing Resin Cartridges", all of which are incorporated herein by reference in their entireties.

BACKGROUND OF THE INVENTION

1. Field of the Invention

The present invention is directed to a system and method for producing partitioned tubular film packages that retain different materials on either side of a partition, and more particularly, to a method of producing mine roof bolt resin packages in which a polymerizable resin component and a catalyst component are retained on opposing sides of a partition in a tubular package.

2. Description of Related Art

Mine roof bolts and other structural elements are often anchored into rock, concrete or the like, by a combination of adhesives and mechanical structures such as an expansion anchor at the distal end of the bolt. Bolts sized ⅝ inch to 1¼ inch in diameter are used in boreholes varying from ¾ inch to 2 inches in diameter. Adhesives are generally formed in place within the borehole by providing a resin cartridge that includes two compartments, with a polymerizable (curable) resin in one compartment, and a hardener or catalyst in another compartment. A borehole is drilled in the rock, and the cartridge containing the polymerizable resin and catalyst is inserted into the blind end of the borehole. When a mine roof bolt is inserted into the borehole, the distal end of the bolt ruptures the package so that the resin and catalyst are mixed. Rotation of the bolt about its longitudinal axis mixes the resin and catalyst. The bolt becomes fixed within the resin upon curing.

In these two component packages, it is critical that the polymerizable resin and the catalyst are maintained separate from each other until the package is ruptured during installation of the mine roof bolt. Some resin cartridges include an inner compartment containing catalyst surrounded by an outer compartment containing the polymerizable resin. Other resin cartridges employ a barrier to divide a container into two compartments with the catalyst and resin on opposing sides of the barrier. In an aggressive environment, such as an underground mine, resin cartridges are often produced from strong films such as polyethylene terephthalate, such as Mylar®. Polyethylene terephthalate provides the desired structural integrity to the resin cartridge, yet is more costly than other pliable films that may be used in less aggressive environments. Conventional resin cartridges often use polyethylene terephthalate for the outer compartment as well as the inner compartment or the barrier, even though these inner structures are not exposed to the underground mine environment and do not require the structural integrity of the outer compartment.

The resin component and the catalyst component may each include filler material in the form of particulate matter. Filler material is used to increase the volume of the package at a low cost compared to the cost of additional reactive components and to control viscosity of the components. The resin cartridges are formulated by balancing the mass of liquid and solids and the particle size of solids to achieve good anchorage. If the viscosity or size of the filler is incorrect, the bolt may be difficult to insert into the borehole or the bolt may be inserted into the borehole, but with poor mixing of the resin and catalyst. The amount of filler, type of filler and size of the filler is important to obtain proper performance under a variety of applications. Using filler that has only very fine particulate matter may result in a product that does not sufficiently shred the tough packaging material. U.S. Pat. No. 4,616,050 (incorporated herein by reference) describes the use of filler with a minimum particle size of 1 mm and describes appropriate ratios of filler size to the annulus dimension between the bolt and borehole. Excess coarse filler in a resin cartridge can result in a product through which it is difficult to properly insert a bolt. In general, bolts that are sized similar to the diameter of the borehole use resin cartridges with a smaller particle size than filler that is used in resin cartridges for bolts that are much smaller in diameter than the borehole.

Upon insertion of the bolt into a borehole, the bolt is rotated to shred the package and enhance mixing until the resin hardens to a degree that nearly prevents the bolt from being rotated, and the resin is allowed to cure. If the mass of the fillers or liquid resin is incorrect, only a portion of the resin may harden. Since it is essentially difficult to determine the degree of hardening of the resin in the borehole, it is desirable that every cartridge have the correct amount of resin, filler, filler particle size, and catalyst and that every cartridge be the same and be formulated to achieve the optimum performance for each application.

Resin cartridges are produced via a variety of techniques. In general, these techniques involve advancing a web of a film into a tube shape having a divider within the tube, thereby producing a partitioned tube. One compartment of the partitioned tube receives the resin composition and the other compartment of the partitioned tube receives the catalyst composition. The tube is sealed off at intervals to produce lengths of the filled package.

The partitioned package is filled in a packaging machine that receives a stream of a curable resin composition into one compartment and a stream of catalyst composition in the other compartment. The resin composition and the catalyst composition are prepared in separate mixing vessels and are transferred to the packaging machine. The preparation and transfer of the resin composition and the catalyst composition has conventionally been conducted in batch operations or semi-continuous operations with minimal feedback or process controls.

Accordingly, a need exists for a resin cartridge production system that operates on a continuous basis with enhanced process controls for adjusting the compositions of the resin and catalyst components.

SUMMARY OF THE INVENTION

The present invention provides a method and system for producing resin cartridges which include components and features that allow for continuous production of resin cartridges in partitioned packages with feedback for adjusting the process conditions to maintain consistent quality of the resin cartridges produced.

The present invention includes a method of producing packages containing a curable resin composition and a catalyst composition that react with each other when mixed, comprising providing a partitioned tube for receiving the resin composition and the catalyst composition in separate compartments; delivering a stream of a resin composition into one compartment of the tube; delivering a stream of a catalyst composition in the other compartment of the tube; advancing the partitioned tube and constricting and sealing the partitioned tube at spaced apart intervals and severing the sealed tube to produce a package partitioning the resin composition from the catalyst composition, wherein the method includes continuously adding solid particulate into the stream of at least one of the catalyst composition and the resin composition and mixing the solid particulate into the stream to produce at least one mixed composition; and controlling the relative amount of solid particulate in the mixed composition by continuously determining the mass of solid particulate added to the mass of the stream. In another embodiment, the present invention includes a method of producing a resin cartridge having one compartment containing a curable resin and another compartment containing a catalyst, the method comprising providing a resin stream from a resin feed device; providing a catalyst stream from a catalyst feed device; continuously mixing filler material into the resin stream to produce a resin composition; continuously mixing filler material into the catalyst stream to produce a catalyst composition; delivering the resin composition and the catalyst composition into the respective compartments of a cartridge, wherein the resin and catalyst compositions are adjusted by altering the composition of at least one of the resin stream and the catalyst stream or by altering the amount of filler material mixed into the resin stream or the catalyst stream. The system of the present invention includes a dual compartment resin cartridge production system comprising a bulk materials handling subsystem for providing resin; a resin and filler mixing subsystem for providing a resin composition; a catalyst subsystem for providing a catalyst composition; a packaging machine subsystem for receiving the resin composition and the catalyst composition in separate compartments of a cartridge; and a computer network comprising controllers for operating at least one of the subsystems, the controllers providing feedback to the at least one subsystem for adjusting the subsystem.

DETAILED DESCRIPTION OF THE INVENTION

Figure 1:
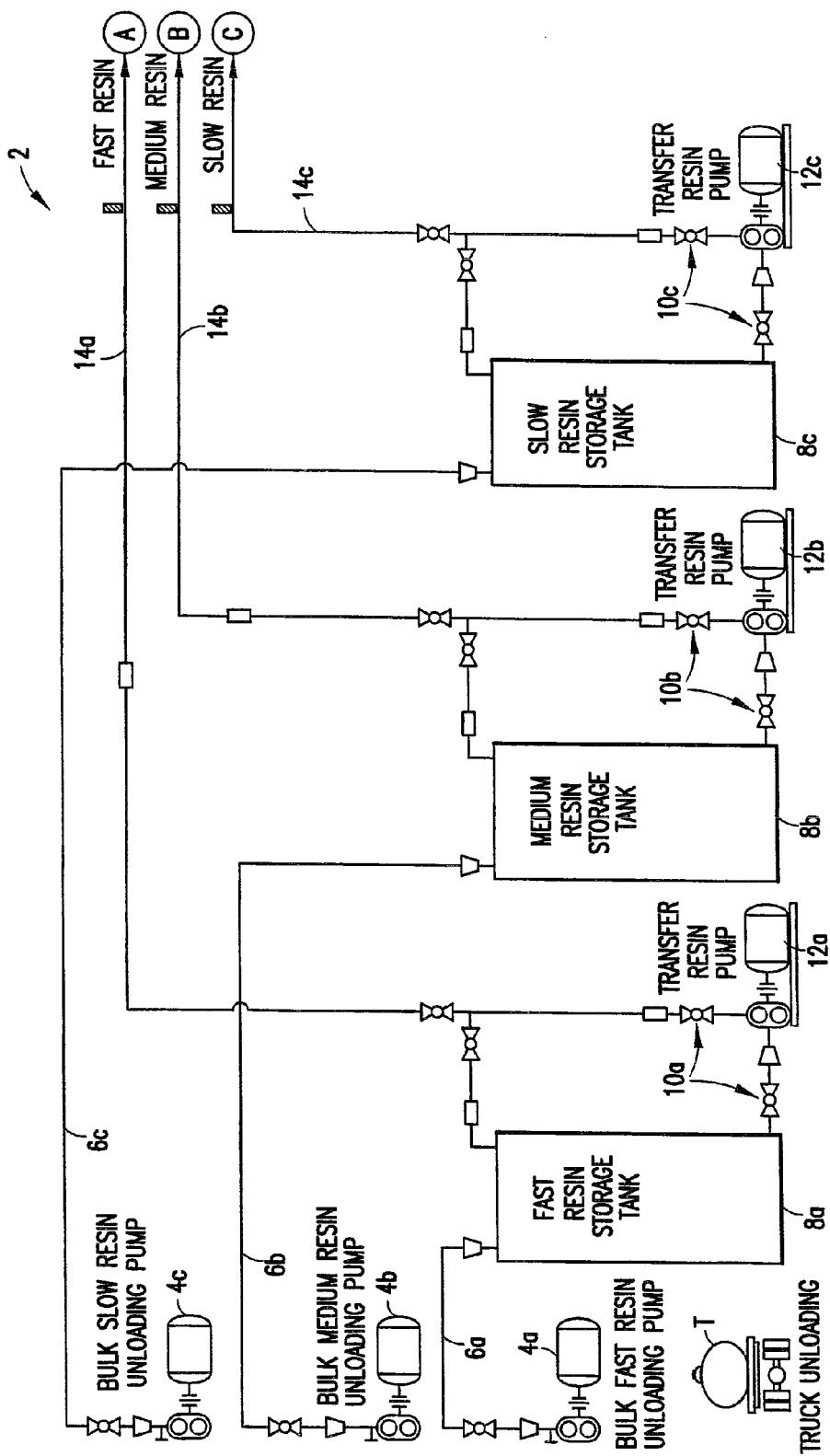
FIG. 1 is a schematic of the unit operations and controls for providing resin in the system of the present invention.

The present invention is described with reference to producing two-component cartridges containing a resin component and a catalyst component for effecting polymerization of the resin upon rupture of the cartridge and mixing of the components, particularly for use in anchoring mine roof bolts. However, this use is exemplary only and not meant to be limiting. The resin cartridges produced using the present invention may be used to anchor other structural compounds. Moreover, the two-component cartridges of the present invention may be used for housing other components that may or may not be reactive with each other.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

FIGS. 1-4 represent the schematic of the system 2 of the present invention for delivering a curable resin composition and a catalyst composition to a packaging machine. The packaging machine is not shown in detail in the drawings and is not limited hereby, except that the packaging machine is suitable for packaging reactive components into a partitioned package.

In one embodiment of the present invention, varying resin compositions are used to produce resin cartridges. For example, the resin may include highly reactive resin that reacts and cures quickly ("fast" resin), low reactive resin that reacts and cures slowly ("slow" resin) and "medium" speed resin that reacts and cures at intermediate speed. Referring to FIG. 1 (a first portion of the system 2), bulk resin from tanker trucks T (one being shown) is unloaded via resin pumps 4a, 4b, 4c for respective fast, medium and slow resins via supply lines 6a, 6b, 6c to resin storage tanks 8a, 8b, 8c that accommodate the varying speed resin compositions that include pumps, valves and associated line controls for transferring resin. Resin is transferred from tanks 8a, 8b, 8c via valve arrangements 10a, 10b, 10c and pumps 12a, 12b, 12c through supply lines 14a, 14b, 14c therein to a downstream portion of the system. Three resin storage tanks 8a, 8b, 8c are shown in FIG. 1, but this is not meant to be limiting. By incorporating more than one resin storage tank containing resins with varying cure rates, the system 2 of the present invention has flexibility in the ability to produce resin cartridges containing resin which cures at different rates depending on the desired end use. However, only one resin composition (stored in one resin storage tank) may be used, or more than three different resin compositions may be used.

Figure 2:
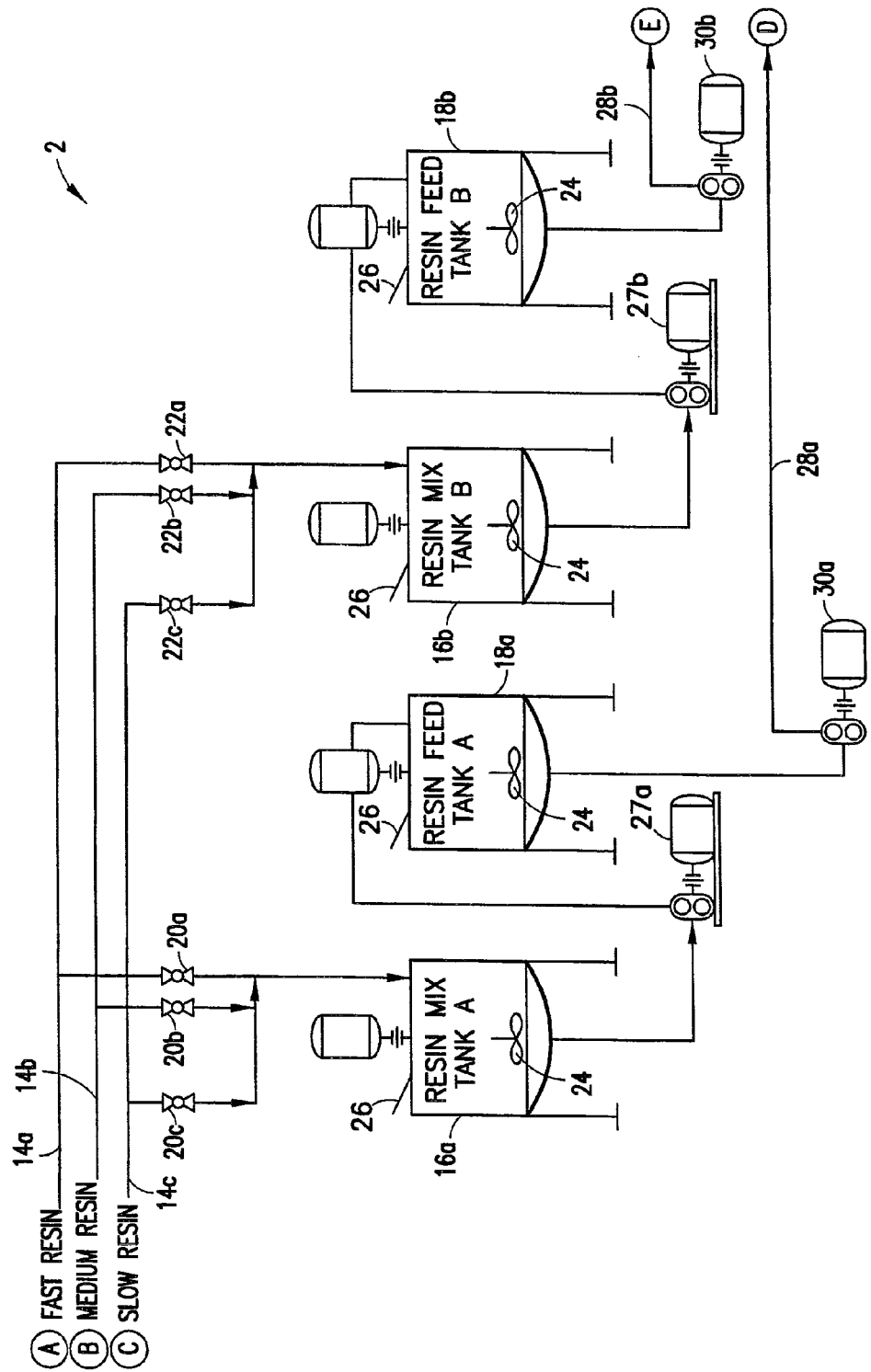
FIG. 2 is a schematic of the unit operations and controls for supplying resin in the system of the present invention.
Figure 3:
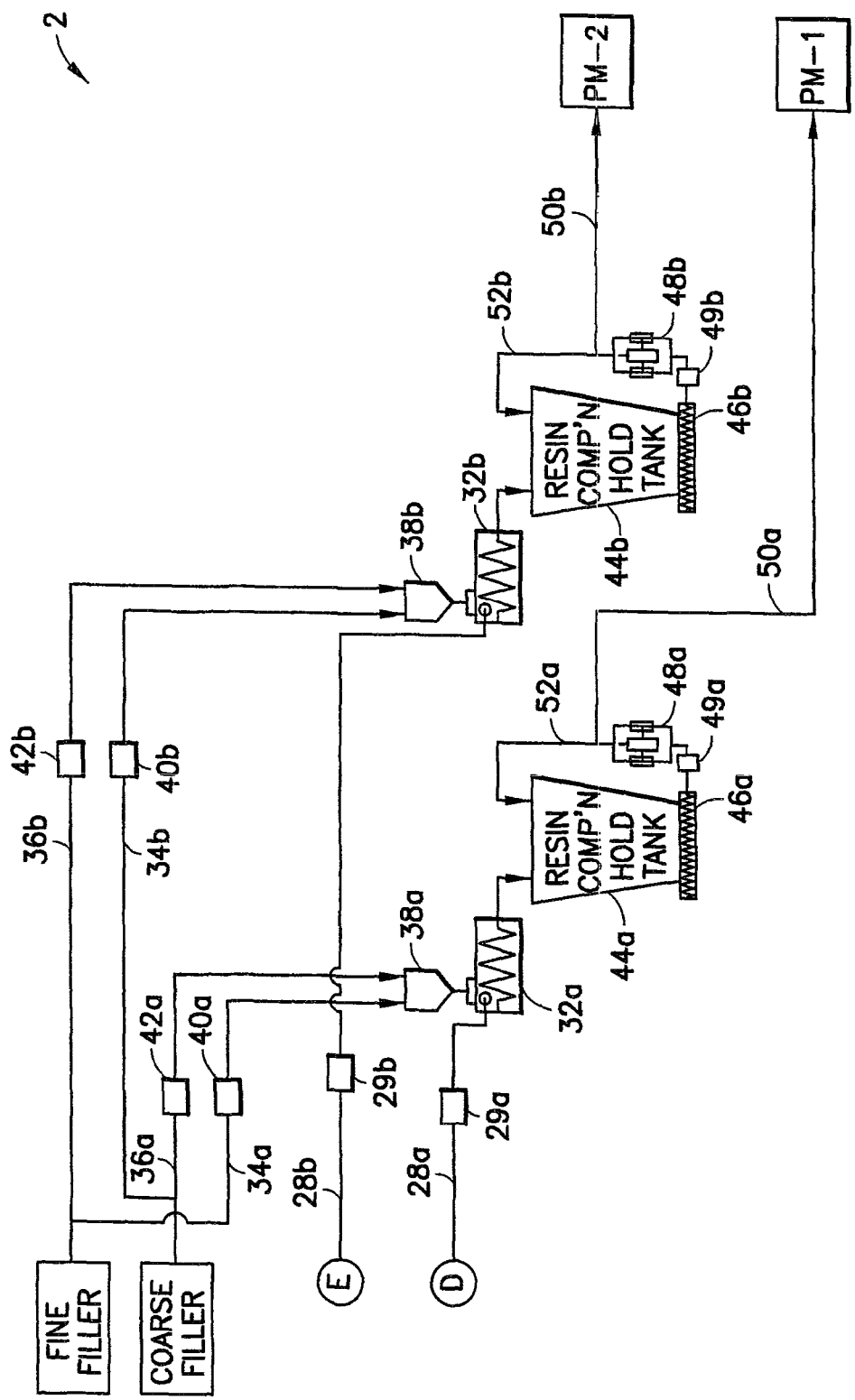
FIG. 3 is a schematic of the unit operations and controls for mixing particulates into resin in the system of the present invention.

FIG. 2 depicts a second portion of the system 2 wherein fast resin, medium resin and slow resin in respective lines 14a-14c are provided to resin mix tank A (16a) and resin mix tank B (16b) and respective resin feed tank A (18a) and resin feed tank B (18b). As indicated in FIG. 2, each of the resin mix tanks 16a, 16b receives resin from each of the three resin storage tanks 8a-8c via lines 14a-14c, thereby providing a mixture of fast resin, slow resin and medium speed resin. Lines 14a-14c are provided with two sets of flow meter/control valve arrangements 20a, 20b, 20c and 22a, 22b, 22c for controlling the amount of resin delivered to resin mix tanks 16a and 16b. Tanks 16a and 16b are equipped with an agitator 24 for mixing resin and level controlling and sampling ports (not shown) as well as access lids 26 for manually adding material (such as a thickening agent) or removing material (such as for sampling) from tanks 16a, 16b. The mixed resins in tanks 16a, 16b are transferred to resin feed tanks 18a, 18b equipped with agitators 24, as well as level controllers and sampling ports (not shown) and access lids 26. Resin modifiers may be added manually to resin mix tanks 16a, 16b. Such modifiers include but are not limited to stabilizers, accelerators (such as dimethyl-p-toluidine or dimethyl aniline), inhibitors (such as quinones), colorants (dyes or pigments). Addition of resin modifiers may also be automated for controlled addition to resin mix tanks 16a, 16b based on production needs or quality control. Resin mix tank 16b and resin feed tank 18b operate in parallel to tanks 16a and 18a. These parallel resin tank arrangements provide flexibility in the type of resin delivered to a packaging machine. Adjustment of the type of resin produced can be made on the fly by switching between the parallel tank arrangements. However, only one or more than two sets of a resin mix tank and resin feed tank may be incorporated in the system of the present invention. Outlet lines 28a, 28b of resin feed tanks 18a, 18b include pumps 30a and 30b for transferring the resin mixture to a third portion of the system 2 as shown in FIG. 3. It will be appreciated that the contents of resin mix tanks A and B (16a, 16b) may be operated in a batch mode. Upon achieving the desired composition of resin in mixtures 16a, 16b, the resin is transferred to resin feed tanks 18a, 18b via pumps 27a, 27b. Resin feed tanks 18a, 18b serve as starting points of a continuous process of supplying resin to the packaging machines PM-1, PM-2.

Referring to FIG. 3, the resin mixture is combined with a filler of a particulate matter to provide a resin composition. The relative amount of particulate matter that is added to the resin as a filler material affects the cost and performance of the final product. A high relative amount of resin increases the cost of the resulting product and can decrease the performance due to shrinkage and low stiffness of the resin upon curing. Insufficient resin or a high relative amount of particulate matter results in a product with excessive viscosity, which makes it difficult to properly insert the bolt or results in poor mixing. The particulate matter may include fillers of varying sizes such as 500 μm or less (fine filler) to 6000 μm (coarse filler). The balance of the amount of coarse and fine fillers also affects the product performance. For a given filler, there generally is an optimal ratio of fine filler to coarse filler that produces an acceptable viscosity in the resin composition. For small boreholes (e.g., 1 inch) with a smaller annulus between a bolt and the borehole wall, it may be advantageous to use a higher proportion of fine filler than in larger boreholes. The proportional amounts of fine filler and coarse filler may be selected as disclosed in U.S. Pat. No. 5,993,116 to Paxton et al., incorporated herein by reference. In order to accurately control the amount of coarse and fine fillers added to a resin cartridge, the present invention employs mass meters for determining the amount of filler added to the resin. An insufficient amount of filler used can negatively impact resin strength, stiffness and shrinkage, which may result in poor bonding and roof support.

The resin mixture from line 28a is metered through mass flow meter 29a and supplied to an in-line mixer 32a. Particulate matter, such as limestone, sandstone or shale, is also supplied to the in-line mixer 32a, via lines 34a, 36a to the in-line mixer 32a. Suitable in-line mixers are available from Palmer Manufacturing of Springfield, Ohio. Coarse particulates are provided via line 34a, and fine particulates are added via line 36a into a hopper 38a that feeds to mixer 32a. The respective amounts of coarse and fine particulate matter that are added to the in-line mixer 32a are controlled via mass meters 40a, 42a on respective lines 34a, 36a for the coarse particulates and the fine particulates. In one embodiment, the mass meters 40a, 42a are loss and weight feeders, which weigh the particulates on a belt that feeds to lines 34a, 34b. The resulting resin composition containing particulate matter is transferred to a resin hold tank 44a. The system 2 includes feedback controls for monitoring and adjusting the amount of particulate matter added to the resin composition. In-line mass meters 40a and 42a provide accurate and instantaneous information on the amount of particulate matter added to the resin composition. For example, if the viscosity of the resin composition is excessive at a downstream portion of the system 2, a signal may be automatically or manually generated to reduce the amount of particulate matter added and/or to increase the amount of resin added, that change being monitored by mass flow meters 29a, 29b and/or mass meters 40a, 42a.

The resin composition is remixed via an in-line mixer 46a prior to delivery to packaging machine PM-1. Mixer 46a includes a mixing chamber and a set of parallel twin screws for advancing the composition toward the packaging machine, such as a Moyno 2000 HS System available from Moyno, Inc. of Springfield, Ohio. The twin screws provide post-mixing to the compositions and scrape material off the sides of the mixing chamber. The twin screw in-line mixer 46a of the present invention has intermeshing blades and a combined mixing diameter of both screws that is equal to or greater than the width dimension of the chamber. The twin screws operate at a speed that pumps about 10 times more material through the chamber than is delivered thereto and at least 2 to 10,000 times or 50 to 1,000 times more product per minute than the packaging machines use. This forces a substantial portion of, such as 50 to 1,000 times, the amount of resin composition backward through an upper portion of the mixing chamber. The backward flowing resin composition is folded back into the new material being added and is remixed, thereby ensuring that all product exiting the twin screws is uniform and is substantially blended with new material. This remixing feature within mixer 46a produces a uniform product with minimal or no variance from cartridge to cartridge or between cases of cartridges. The twin screws exert a substantial amount of work on the product, producing heat that reduces the viscosity of the resin composition. The amount of work exerted on the product may be enough to produce a 5° C. temperature rise, or a 5 to 20° C., or no more than 50° C. rise in the product exiting the twin screws.

The twin screw resin mixer 46a is configured to receive a composition having 50% filler and 50% resin or up to 100% filler (no liquid) without plugging or overloading for at least 1 minute or at least 10 minutes. In the event of an interruption in the supply of liquid (resin) feed, the mixer can process dry material thereby avoiding downtime associated with prior resin mixing systems. Prior resin mixing systems cannot process dry material and with loss of liquid feed for just a few seconds, results in failure of the mixer drive shaft, motor, baffles and requires long downtime to repair.

In the present invention, in-line mixer 32a and twin screw mixer 46a ensure that essentially all of the filler material added to the resin will be received downstream. By accurately measuring the mass of particulates added via mass meters, the final composition of the resin composition can be accurately obtained.

A level controller within the mixing chamber of twin screw mixer 46a, such as a radar level controller, provides feedback for increasing the rate of delivery of the resin composition to the mixer 46a, starting or stopping the in-line mixers 32a, 32b. The outlet of mixer 46a is transferred via resin tank booster pump 48a to the packaging machine PM-1 via line 50a and may also be returned via line 52a to the resin hold tank 44a. Likewise, in a parallel operation, resin from line 28b, monitored via mass flow meter 29b, is mixed in mixer 32b, with coarse and fine particulate matter from lines 34b, 36b provided via mass meters 40b, 42b and hopper 38b, held in a resin hold tank 44b, post-mixed via twin screw mixer 46b with delivery to packaging machine PM-2 via line 50b and to resin hold tank 44b via line 52b and pump 48b.

In one embodiment, density flow meters 49a, 49b are provided on respective lines 50a, 50b. Density flow meters 49a, 49b provide data on mass flow rate, density and optional temperature. The density of the resin composition exiting resin composition hold tanks 44a, 44b can be used to determine the relative amounts of resin and filler therein. The density of the resin composition is a function of the relative amounts of the components thereof. For example, the density of resin is low (e.g., about 1-1.4 g/ml), and the density of the filler is higher (e.g., about 2.7-3.0 g/ml). The relative amounts of resin and filler may be determined based on their individual densities and the density of the resin composition. Adjustment of the amounts of resin and/or filler added to the resin composition upstream may be made to achieve a desired density of the resin composition determined by density meters 49a, 49b.

Figure 4:
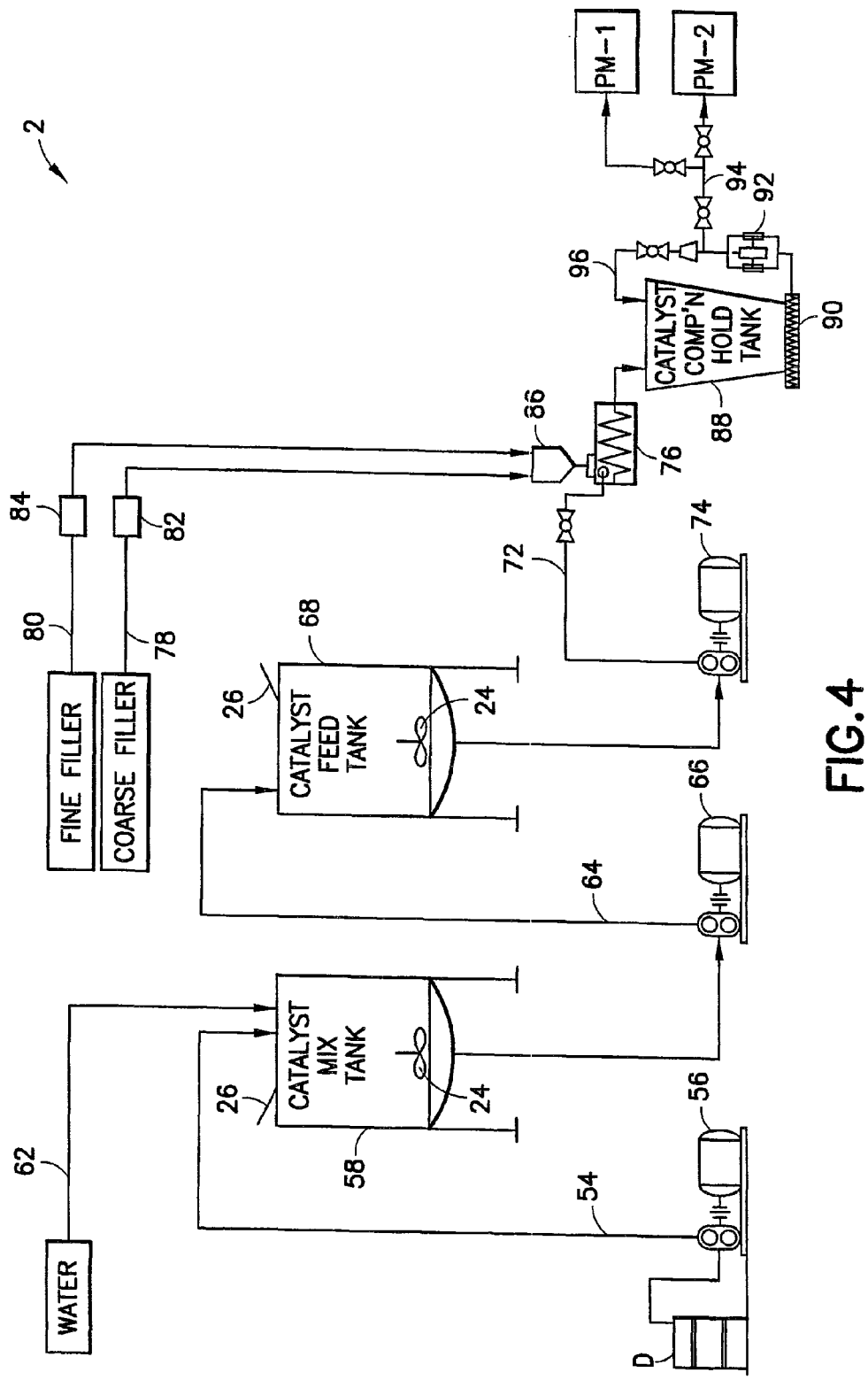
FIG. 4 is a schematic of the unit operations and controls for feeding catalyst mixing particulates into the system of the present invention.

Similarly, FIG. 4 depicts a schematic of the production of catalyst composition for delivery to the packaging machine. A catalyst material (such as benzoyl peroxide in paste form) is provided from a drum D or the like via line 54 and pump 56 and transferred to a catalyst mix tank 58 equipped with an agitator 24 and access lid 26. Water is added via line 62 for diluting the catalyst. In one embodiment, a thickening agent is manually added to catalyst mix tank 58, containing water via access lid 26 until a desired viscosity of material within the catalyst mix tank is achieved. The catalyst is added to tank 58 via line 54, and the contents of tank 58 are checked for catalyst concentration and adjusted as necessary. After mixing, the diluted catalyst composition is transferred via line 64 and pump 66 to a catalyst feed tank 68 equipped with an agitator 24 and access lid 26 for holding the catalyst composition. An outlet line 72 of the catalyst feed tank 68 includes a pump 74 for transferring the catalyst composition to catalyst in-line mixer 76, as shown in FIG. 4. In this manner, catalyst mix tank 58 is operated in a batch mode and catalyst feed tank 68 serves as a starting point of a continuous process for supplying catalyst to the packaging machines PM-1 and PM-2. Coarse particulate matter and fine particulate matter are supplied from respective feed lines 78 and 80 with mass meters 82 and 84 to hopper 86. The amount of coarse and fine particulate matter added to hopper 86 is controlled via mass meters 82, 84. The system 2 includes feedback controls for monitoring the amount of particulate that has been added to the catalyst composition. The catalyst composition with particulate matter is transferred to a hold tank 88. The catalyst composition with particulates is remixed via in-line mixer 90 for final mixing of the catalyst composition prior to transfer to the packaging machines PM-1 and PM-2. In-line mixer 90 is comparable to in-line mixers 46a, 46b in its structure and operation. Outlet of mixer 90 is transferred through line 94 via mixed catalyst pump 92 with optional recycling via line 96.

Packaging machines PM-1 and PM-2 receive resin composition from resin composition hold tanks 44a and 44b, respectively. Catalyst composition is delivered to both packaging machines PM-1 and PM-2 from catalyst composition hold tank 88. A suitable packaging machine is described in U.S. Pat. No. 3,889,446, incorporated herein by reference. Generally, such packaging machines produce resin cartridges by forming a web of pliable film into an advancing first tube with the edges of the tube overlapping each other. A second tube is formed therein by advancing another film into the first tube, thereby creating a second tube within the first tube, i.e., one compartment within another compartment. Alternatively, an edge of the first tube may span the diameter of the tube to create side-by-side compartments. These are only examples of packaging techniques and are not meant to be limiting.

Each of the packaging machines PM-1 and PM-2 include a resin packaging pump and a catalyst packaging pump (not shown) for delivering the resin and catalyst compositions into the two compartments of the packaging, referred to hereinafter as first and second resin packaging pumps and first and second catalyst packaging pumps. The packaging advances as it is filled until a pre-determined length (such as two to three feet) is filled. The packaging machine seals the compartments together and cuts the length of filled packaging at the seal, yielding a cartridge with one compartment containing the resin composition and another compartment containing the catalyst composition.

Figure 5:
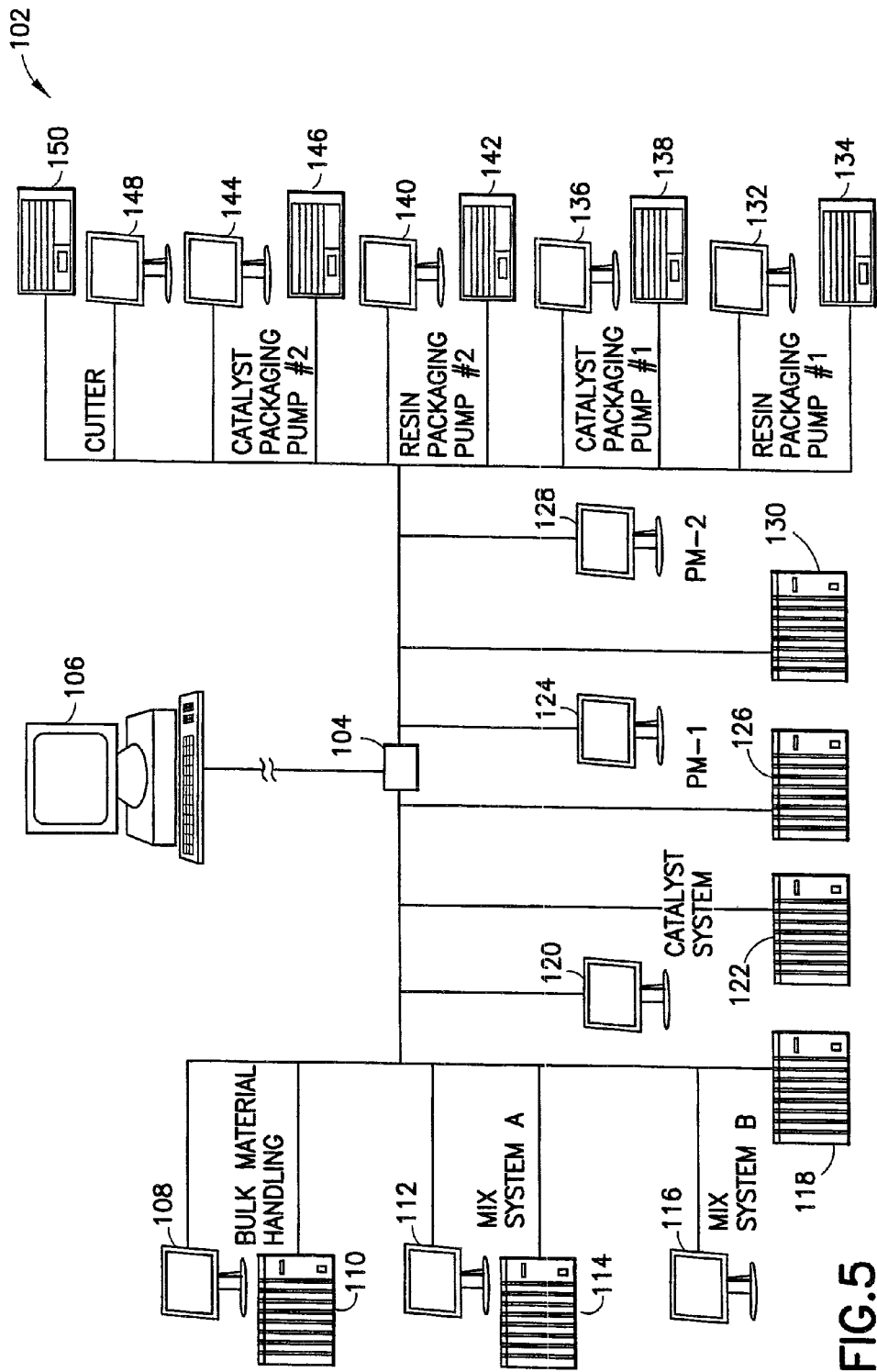
FIG. 5 is a schematic of a computer network for controlling the system of the present invention.

Referring to FIG. 5, the system of the present invention includes a network 102 for controlling the components depicted in FIGS. 1-4 via a remote station. Network 102 includes numerous components in mutual communication via switch or hub 104 with which at least one control terminal 106 communicates. In one embodiment, as detailed below, the network 102 controls the production of resin cartridges according to subsystems such as bulk material handling, resin mixing, catalyst mixing, packaging machine operation, pumping of resin and catalyst to the packaging machines, and cutting and handling of resin cartridges. For at least these subsystems of the system 2, network 102 includes input/output devices (e.g. touch screens) and programmable logic controllers (PLCs). Touch screen 108 and PLC 110 are programmed for automating and controlling the components of the bulk components of the resin and filler, such as the components shown in FIG. 1. Touch screen 112 and PLC 114 for mix system A (i.e., the components 16a-52a of FIGS. 2 and 3) are programmed for automating and controlling delivery of resin to the packaging machine PM-1, including at least the amount of resins (e.g., the relative concentration of slow, medium and fast resins) and the amount of modifiers added to resin mix tank 16a, controlling transfer pump 27a, maintaining the level in resin feed tank 18a, monitoring output of resin mass flow meter 29a, and controlling pump 30a. Delivery of filler is also automated and controlled by touch screen 112 and PLC 114 in monitoring output of mass meters 40a and 42a, controlling operation of mixer 32a, maintaining the level in resin composition hold tank 44a, and controlling operation of mixer 46a and booster pump 48a. Likewise, components 16b-52b (mix system B) of FIGS. 2 and 3 are automated and controlled via touch screen 116 and PLC 118.

Components 54-92 (catalyst system) are automated and controlled via touch screen 120 and PLC 122 in at least controlling the amount of catalyst and solvent added to catalyst mix tank 58, controlling transfer pump 66, maintaining the level in catalyst feed tank 68, controlling pump 74, monitoring output of mass meters 84 and 82, controlling operation of mixer 76, maintaining the level in catalyst composition hold tank 88, and controlling operation of mixer 90 and pump 92.

The packaging machines PM-1 and PM-2 are controlled via touch screen 124 and PLC 126 and via touch screen 128 and PLC 130, respectively. Touch screen 132 and PLC 134 control the first resin packaging pump of packaging machine PM-1. Touch screen 136 and PLC 138 control the first catalyst pump of packaging machine PM-1. Second resin packaging pump and second catalyst packaging pump of machine PM-2 are likewise controlled via respective touch screens 140, 144 and PLCs 142, 146. Touch screen 148 and PLC 150 control cutting of packages by packaging machines PM-1, PM-2 (i.e., the location of cuts), tally the production and calculate production quantities remaining to fulfill a production need.

Each PLC may operate independently of the other PLCs, and communicates within the network 102 to receive control instructions from the network 102. Thus, each PLC can be controlled, changed and monitored locally or remote from the network 102 via terminal 106, such as in a production planning facility. If a problem develops in one subsystem, the other subsystems automatically take corrective actions or shut down the system 2. When a product change is made (e.g., to produce a different resin composition), the resin mix subsystem, catalyst mix subsystem and packaging machines are automatically reconfigured to accommodate the new product. Such product changes may be made locally or remotely via terminal 106. Terminal 106 also records and archives process information, including any alarms. This historical data may be reviewed and is available for troubleshooting on-site or remotely.

The PLCs 110, 114, 118, 122, 126, 130, 134, 138, 142, 146 and 150 monitor their respective portions of system 2 and make adjustments to maintain desired set points. The desired set points may be based on compositional requirements (e.g., relative amounts of resin and filler) or property requirements (e.g., density of resin composition fed to the packaging machine) or both. For example, if the output of mass meter 40a indicates that the amount of fine filler being added to mixer 32a is lower than a predetermined set point, PLC 114 will increase the feed rate for fine filler until the set point is reached. Alternatively, if the output of density flow meter 49a indicates that the resin composition contains a lower proportion of filler than desired, PLC 114 will increase the feed rate for fine filler or coarse filler or both to achieve a predetermined set point for the density of the resin composition. These are examples of how the PLCs may be used to control the process and are not intended to be limiting. Alternatively, or in addition thereto, the system 2 may include components (not shown) for determining viscosity of the compositions, such as the mixed resin, the catalyst, the resin composition containing filler, or the catalyst composition. Viscosity measurements may also be made off-line from samples.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A method of producing a resin cartridge having one compartment containing a curable resin and another compartment containing a catalyst, the method comprising:
    providing a continuous resin stream from a resin feed device;
    providing a continuous catalyst stream from a catalyst feed device;
    continuously mass metering a continuous stream of solid particulate filler material and mixing the filler material into the resin stream to produce a resin composition;
    continuously mass metering a continuous stream of solid particulate filler material and mixing the filler material into the catalyst stream to produce a catalyst composition; and
    delivering the resin composition and the catalyst composition into the respective compartments of a cartridge,
    wherein the resin and catalyst compositions are adjusted by altering the composition of at least one of the resin stream and the catalyst stream or by altering the amount of solid particulate filler material mixed into the resin stream or the catalyst stream.

2. The method of claim 1, wherein the resin stream comprises a plurality of resin components and the composition of the resin stream is adjusted by altering the relative amounts of the resin components delivered to a resin stream feed device.

3. The method of claim 1, wherein the catalyst composition comprises a catalyst component and a solvent and the composition of the catalyst stream is adjusted by altering the relative amounts of catalyst and solvent delivered to a catalyst stream feed device.

4. The method of claim 1, wherein the amount of filler material mixed into the resin stream or the catalyst stream is altered by controlling the mass of filler material added thereto to achieve a desired viscosity.

5. The method of claim 4, further comprising determining the density of the resin composition, determining the relative amounts of resin and filler material in the resin composition based on the density of the resin composition, wherein the step of adjusting the resin composition comprises altering the relative amounts of resin and filler material to achieve a desired density of the resin composition.

6. The method of claim 1, wherein adjustments to the composition of the resin stream or the catalyst stream or to the amount of filler material added thereto are performed by a programmable logic controller.

7. The method of claim 6, wherein the adjustments are made to maintain the composition of the resin composition or the catalyst composition within predetermined limits or to maintain a property of the resin composition or the catalyst composition.

8. The method of claim 1 wherein the method is performed using a dual compartment resin cartridge production system comprising:
    a bulk materials handling subsystem for providing resin;
    a resin and filler mixing subsystem for providing a resin composition;
    a catalyst subsystem for providing a catalyst composition;
    a packaging machine subsystem for receiving the resin composition and the catalyst composition in separate compartments of a cartridge; and
    a computer network comprising controllers for operating at least one of said subsystems, said controllers providing feedback to said at least one subsystem for adjusting said subsystem.

9. The method of claim 1 wherein the continuous stream of solid particulate filler material is substantially free of liquid.

10. The method of claim 1 wherein the composition of the resin stream is altered in response to a density detected by at least one sensor.

11. A method of producing a resin cartridge having one compartment containing a curable resin and another compartment containing a catalyst, the method comprising:
    providing a continuous resin stream from a resin feed device;
    providing a continuous catalyst stream from a catalyst feed device;
    continuously mixing a continuous stream of solid particulate filler material into the resin stream to produce a resin composition;
    continuously mixing a continuous stream of solid particulate filler material into the catalyst stream to produce a catalyst composition;
    delivering the resin composition and the catalyst composition into the respective compartments of a cartridge,
    wherein the resin and catalyst compositions are adjusted by altering the composition of at least one of the resin stream and the catalyst stream or by altering the amount of solid particulate filler material mixed into the resin stream or the catalyst stream, and wherein the composition of the resin stream is altered in response to a density detected by at least one sensor.

12. The method of claim 11 wherein the resin composition is homogenous and the catalyst composition is homogenous.

* * * * *